Dec. 3, 1968 L. E. COOPER 3,414,850

MULTI-PHASE CIRCUIT BREAKER GANGING DEVICE USING CIRCULAR COMMUNICATION BETWEEN PHASES

Filed Oct. 24, 1965 9 Sheets-Sheet 1

INVENTOR.

LAWRENCE E. COOPER,

BY

John A. Haug

ATT'Y.

INVENTOR.
LAWRENCE E. COOPER,
BY
John A. Haug
ATT'Y.

INVENTOR.
LAWRENCE E. COOPER,
BY
John A. Haug
ATT'Y.

INVENTOR.
LAWRENCE E. COOPER,
BY
John A. Haug
ATT'Y.

INVENTOR.
LAWRENCE E. COOPER,
BY
John A. Haug
ATT'Y.

INVENTOR.
LAWRENCE E. COOPER,
BY
John C. Hany
ATT'Y.

INVENTOR.
LAWRENCE E. COOPER,
BY
John C. Haag
ATT'Y.

INVENTOR.
LAWRENCE E. COOPER,
BY
John C. Haug
ATT'Y.

INVENTOR.
LAWRENCE E. COOPER,
BY
John C. Haug
ATT'Y.

3,414,850
Patented Dec. 3, 1968

3,414,850

MULTI-PHASE CIRCUIT BREAKER GANGING DEVICE USING CIRCULAR COMMUNICATION BETWEEN PHASES

Lawrence E. Cooper, Attleboro, Mass., assignor to Texas Instruments Incorporated, Dallas, Tex., a corporation of Delaware Filed Oct. 24, 1965, Ser. No. 504,397
9 Claims. (Cl. 335—8)

ABSTRACT OF THE DISCLOSURE

Multi-phase circuit breakers having means for tripping the phases sequentially or in cascade. Each unit is separately calibrated and trip free. The linkage means for operatively associating the movement of a contact arm of one unit with the tripping mechanism of others of the units in one embodiment comprise a rotary latching device and associated slides. The rotary linkage means extends from the first of the phase units to the last and is operative only to link the motion of the contact arm of the first unit to the tripping mechanism of the last unit. The slide linkage means are positioned between the units to a tripping mechanism of an adjacent unit. Each respective slide linkage means is slidable in a space between adjacent units. The contact arm of one unit moves the slide to trip the adjacent unit by striking the trip mechanism.

This invention relates to multi-phase circuit breakers of the kind in which if one of the phase circuit breakers trips, all of the other phases will trip, and in particular to improved means for tripping the phases.

Multi-phase circuit breakers are often made by ganging together individual single phase circuit breakers, and then providing a linkage means between the phases to cause all phases to trip out on overload, in the event that one of the individual phase units trips out. The linking of the phases together in order to accomplish this result presents difficulties, in view of the manufacturing tolerances that are necessary in order to make the individual units, and also the forces involved when the moving mechanism of one phase must cause other phases to trip. In addition, the calibration of the respective phases in such manner as to be independent of each other when there is a linkage means between the various phases also presents problems, in view of the necessary mechanical movement inter-relations between the various phases, which inter-relations must take into account the manufacturing tolerances of the various parts of the units, the necessary lost motions, and the relative efficiencies of the magnetic circuits that are used to trip the various phases. Of these problems, the mechanical loading problem on one of the phases which is encountered because of the necessity of having that phase trip the other, is one of the more important.

Essentially, this invention is concerned with providing an improved mechanical linkage means between the several phase units of a multi-phase circuit breaker of the above class to minimize or to solve the above problems.

Among the several objects and provisions of the invention, therefore, may be noted the following: the provision of a circuit breaker of the class described, in which a linkage means is provided for the several phase units comprising the circuit breaker, of such kind that the respective phases trip sequentially or in cascade; the provision of a circuit breaker of the class described in which the calibration of the individual units of the poly-phase circuit breaker is relatively independent of the calibration of the other units; the provision of a circuit breaker of the class described in which lost motion is readily provided in each unit without seriously affecting the efficiency of the magnetic circuit; the provision of a circuit breaker of the last named class in which the lost motions provided permit greater tolerance in adjusting or predetermining the motions of the several linkage means; the provision of a circuit breaker of the above classes in which the mechanical loading problem on one unit thereof because of its relation to another unit, is minimized; the provision of a circuit breaker of the class described in which each unit of the combined assembly is responsible for tripping only one of the other units; the provision of a circuit breaker of the class described in which each of the armatures of the units is more readily pre-calibrated; the provision of a circuit breaker of the class described which is trip free; the provision of a circuit breaker of the class described as to which multiple ganging of similar units may be readily accomplished by using similar parts; and, finally, the provision of a circuit breaker of the class described which is relatively easy to make, economical in its manufacture and calibration; and adapted to mass production.

Other objects will be in part obvious and in part pointed out hereinafter.

The invention accordingly comprises the elements and the combinations of elements, features of construction, and arrangement of parts which will be exemplified in the structures hereinafter described, and the scope of the application of which will be indicated in the following claims.

In the accompanying drawings in which are illustrated an embodiment of the invention:

Throughout the drawings, similar reference characters illustrate corresponding parts of the embodiments. The various drawings in some instances may have been exaggerated as to relative thickness of parts, or size, in order to show detail with greater clarity.

Figure 1:
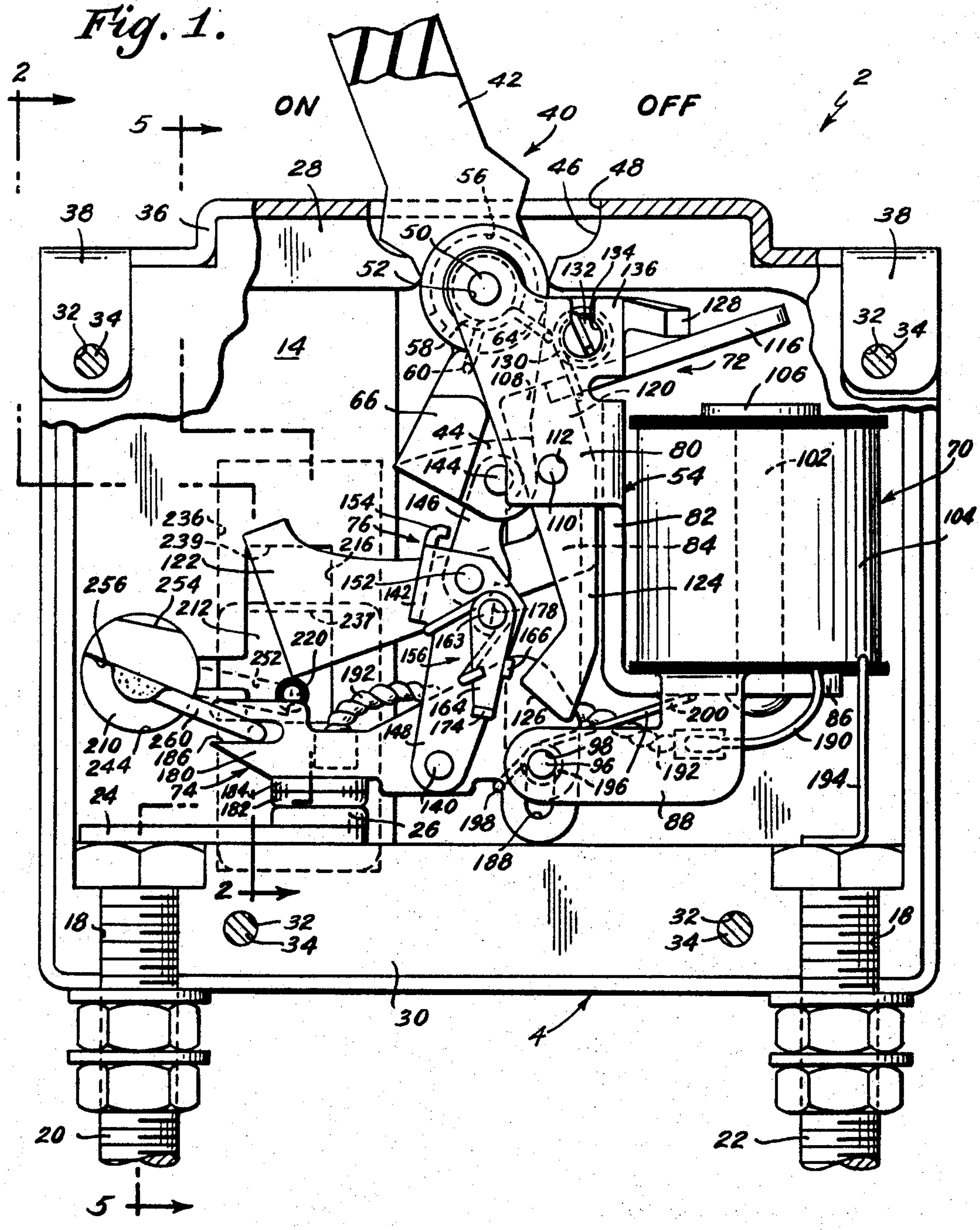
FIG. 1 is a sectional elevation of one embodiment of this invention, in this instance a 3-phase circuit breaker.
Figure 3:
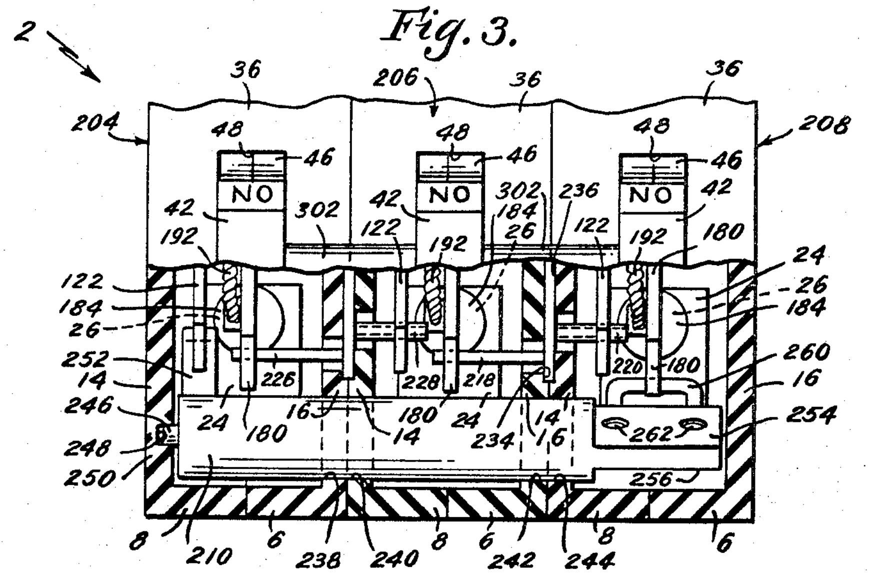
FIG. 3 is a plan view of the FIG. 2 embodiment, partly in section, and taken in the direction of sight lines 3—3 on FIG. 2.
Figure 2:
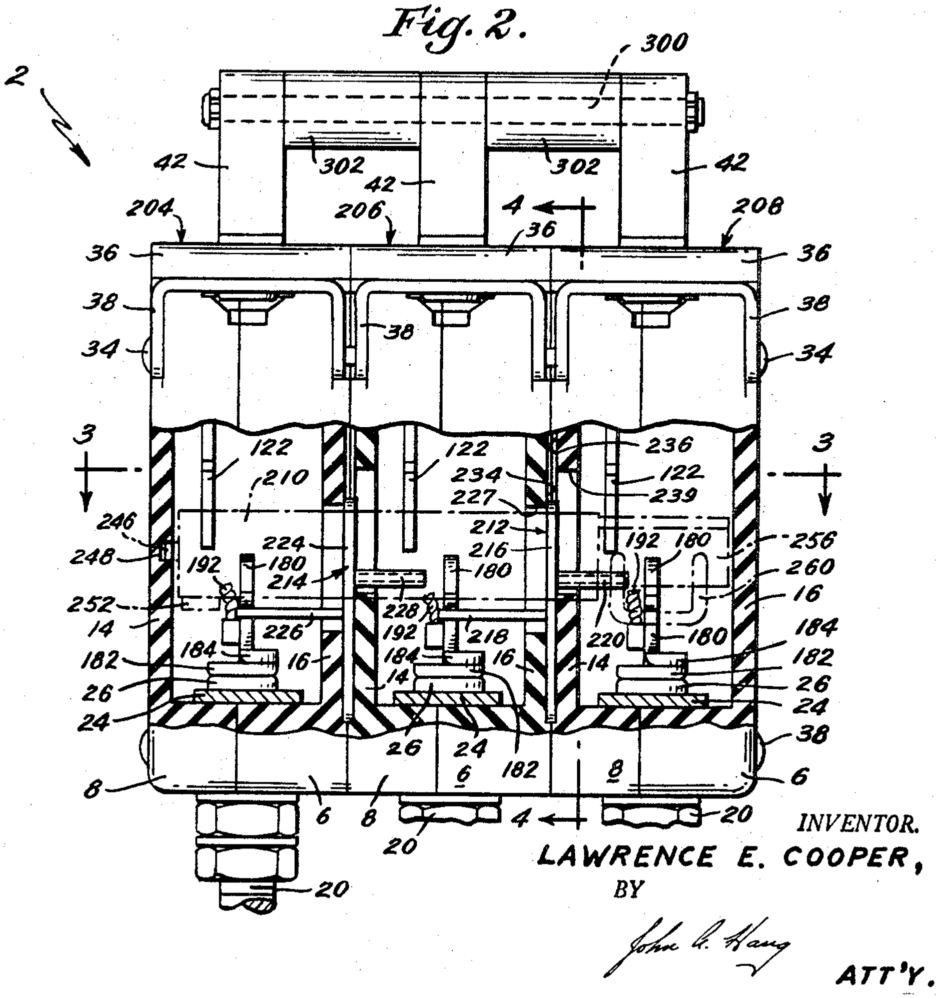
FIG. 2 is an end view of the FIG. 1 embodiment of the invention, partly in section.
Figure 5:
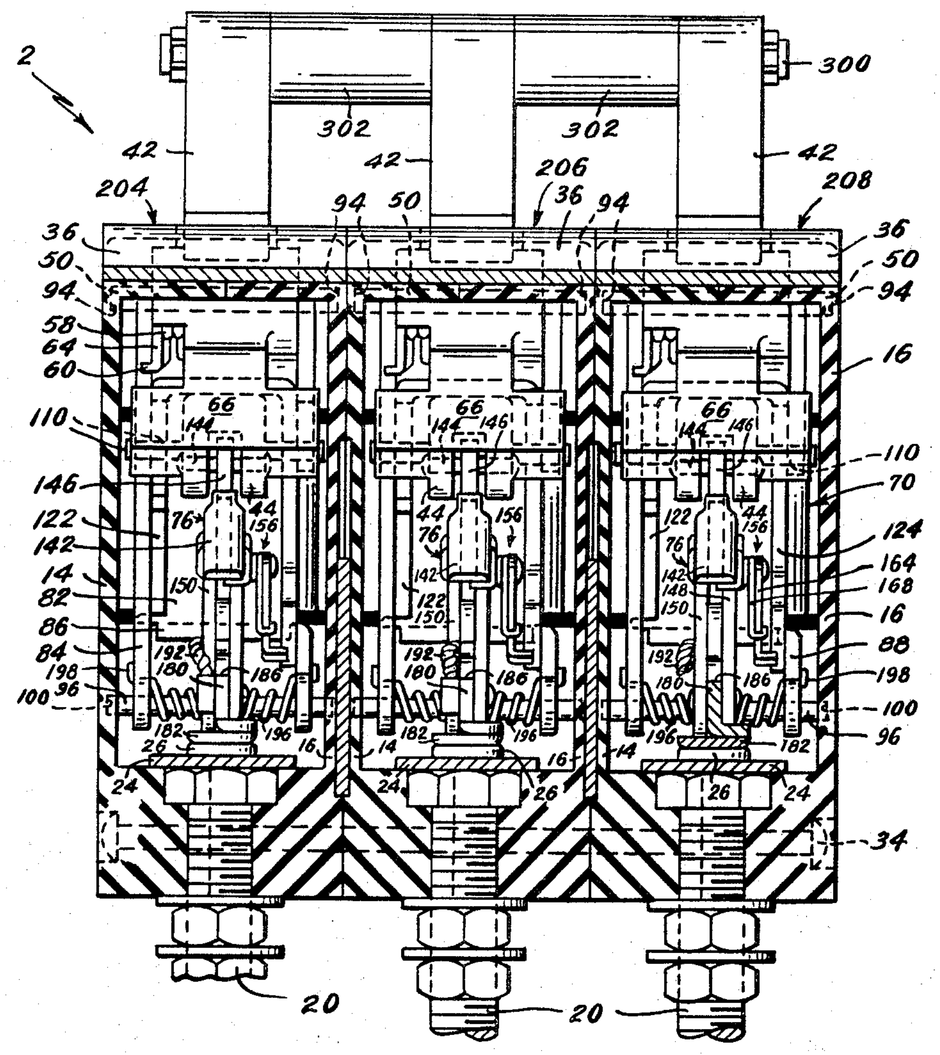
FIG. 5 is a sectional end view of the FIG. 1 embodiment, taken in the direction of sight lines 5—5 on FIG. 1.

Turning now to FIGS. 1, 2 and 3 for a further description of invention, there is shown in FIG. 1 a vertical view, partly in section, of a three-phase circuit breaker in which the various parts are shown in their working relationship with the electrical contacts therein closed. It will be understood that FIG. 1 shows a view of just one of the elements or units of the particular embodiment, in which the other units are substantially the same as the unit shown in this figure. It will be understood that in a combination of such units, there will be *n* units where *n* is an integer and equals two or more.

The exemplary unit circuit breaker is generally indicated by reference numeral 2, and each unit includes a housing generally indicated by a reference numeral 4 having a front shell 6 and a back shell 8, each formed of a suitable insulating material such as, for example, an arc-resistant, moldable, phenolic, resinous material; and each of shells 6 and 8 having a top 10, bottom 12, and front and back walls 14 and 16. Each shell also contains suitable mating openings 18 for mounting therein terminals 20 and 22 of conventional structure, and made of a suitable electrically conductive material. On one of the terminals 20 is connected an electrically conductive contact arm 24 to which is mounted a stationary electrical contact 26 by means providing good electrical conductivity such as, for example, by welding.

The tops and bottoms of each of the housing shells 6 and 8 include thickened portions 28 and 30 which extend the width of each shell. The thickened portions 28, 30 include apertures 32 passing therethrough for receiving fasteners 34, which may be screws, rivets or the like, and which retain the shells in tight fitting engagement. Mounted on the top of the housing 4 is a cover member 36 having tab portions 38 which bracket the housing 4 and through which the fasteners 34 pass to retain the cover on housing 4.

The circuit breaker 2 also includes a toggle actuating assembly generally indicated by reference numeral 40 which includes a one-piece toggle handle 42 and toggle link 44 formed of a suitable electrical insulating material such as, for example, an arc-resistant. moldable, phenolic, resinous material. Thickened top portion 28 is recessed at 46 to receive toggle unit 42—44. The cover 36 includes an opening 48 through which toggle handle 42 projects and which is of a size sufficient to allow movement of the toggle handle between the "on" position shown in FIG. 1 and the "off" position shown in FIG. 8.

Handle 42 and toggle link 44 are provided as a unit about a pin 50 passing through an aperture in the toggle unit 42–44, and through apertures 52 in the mounting frame member generally indicated by reference numeral 54. A portion of the toggle unit 42–44 surrounding the pin 50 is hollowed out to provide a housing 56 for a toggle spring 58, one of whose ends 60 abuts a portion of the frame 54 as shown, and the other of whose ends 64 abuts a portion of the toggle link 44 to urge the toggle to the "off" position shown in FIG. 8. Toggle link 44 includes a raised portion 66 which abuts the frame 54 as shown to provide a stop for the handle and toggle 42–44 when it is in its "on" position as shown in FIG. 1.

Included within the housing 4 are the aforesaid frame member generally indicated by numeral 54; a magnetic assembly generally indicated by reference numeral 70; an armature member associated with the magnetic assembly 70 and generally indicated by reference numberal 72; a movable contact arm assembly generally indicated by reference numeral 74, mounted on the frame 54 and electrically connected to the coil of the magnetic assembly 70; and a collapsible linkage assembly, generally indicated by reference numeral 76, which is attached at one end to the contact arm assembly 74 and at the other end to the toggle structure 40.

Figure 17:
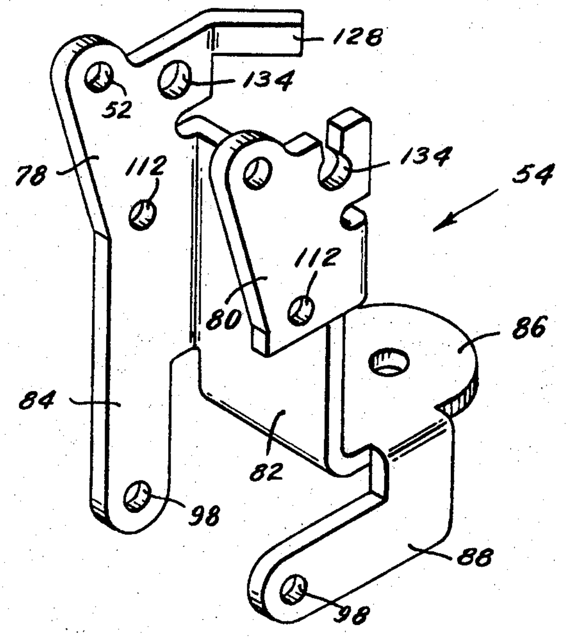
FIG. 17 is a perspective view of a magnetic supporting structure used in the FIG. 1 embodimeent.

As best seen in FIGS. 1 and 17, the frame 54 is of single piece construction and includes a pair of wings 78 and 80 integrally attached to a back 82. Wing 78 extends to form the leg 84. Back 82 is L-shaped to form the base 86, and extending from base 86 is a support member or leg 88. The frame 54 is formed of a suitable corrosion-resistant magnetic material such as nickel plated steel.

The frame 54 is retained in fixed relationship within the housing 4 by means of the said pin 50 which extends through the aforesaid apertures 52 in the upper portions of wings 78 and 80 and into anchoring recesses 94 in the front and back walls 14 and 16 of housing 4. The lower end of frame 54 is similarly anchored by pin 96 which extends through apertures 98 in the lower portion of legs 84 and 88 into anchoring recesses 100 in front and back walls 14 and 16.

The frame 54 also mounts on support member 88 the magnetic assembly 70 which may be of conventional type. It comprises a core 102 securely fastened to leg 86 about which is wound in conventional manner the coil 104. A pole piece 106 at the end of core 102 is provided.

Figure 18:
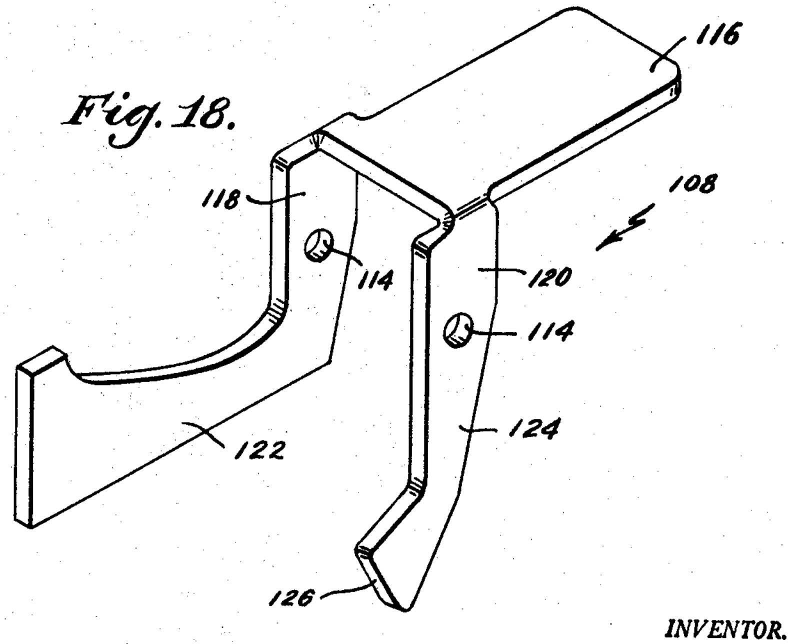
FIG. 18 is a perspective view of an armature and tripping lever structure used in the FIG. 1 embodiment.

Associated with magnet assembly 70 is a rotatable member 108 which is mounted on frame 54 for rotation about a pin 110 passing through apertures 112 in frame wings 78 and 80 and apertures 114 in member 108. Rotation of member 108 on pivot pin 110 in frame 54 is facilitated by washers (not shown) on pin 110 between member 108 and frame wings 78 and 80, the washers being formed of a suitable material such as, for example, Teflon. As best seen in FIG. 18, rotatable member 108 includes an armature portion 116 extending in a first direction, and, extending in a second direction, a pair of legs 118 and 120. A balancing extension or arm 122 to balance (about pin 110) the entire rotatable member 108 extends from the end of leg 118. Extending from the end of leg 120, in generally the same direction as the legs 118 and 120, is a trip lever 124 including a cam surface 126 at its end. The electromagnetic forces developed by magnetic assembly 70 attract armature 116 and urge it to rotate in a clockwise direction as viewed in FIG. 1 about pin 110 towards engagement with pole piece 106 on the upper end of magnetic core 102. This motion moves the end of trip lever 124 to the left as drawn. It is also to be noted that upward motion of balance arm 122 (as drawn) will move the end of trip lever 124 to the left.

Armature 116 and thus member 108 are urged to rotate in a counterclockwise direction as viewed in FIG. 1, into engagement with bent-over tab portion 128 on frame 54, which acts as a calibrated stop for armature 116, by a spring 130 wound on a slotted pin 132 carried by the frame 54. One end of pin 132 rests in a slot 134 and, when pin 132 has been rotated to tension spring 130 to the required point, the tab 136 is bent to reduce the size of slot 134, thus securing pin 132 against rotation to hold spring 130 in calibrated position.

A collapsible linkage assembly indicated generally by numeral 76 is pivotally connected at its lower end to contact arm 180 of contact arm assembly 74 by a pivot pin 140 which rotatably extends through contact arm 180 and a center link 142. At its upper end, assembly 76 is pivotally connected to toggle actuating assembly 40 by a riveted-over pin 144 passing through apertures in the lower end of toggle-link end 44 and the upper end of an upper link 146.

Center link 142 is of folded construction to provide the wings 148 and 150, as shown. The lower end of upper link 146 fits loosely between the upper portions of the wings of the center link and is pivotally connected to link 142 by pin 152 passing through the wings 148 and 150 and the link 142. At the lower end of center link 142, the wings 148 and 150 straddle the contact arm 180.

Figures 9, 10:
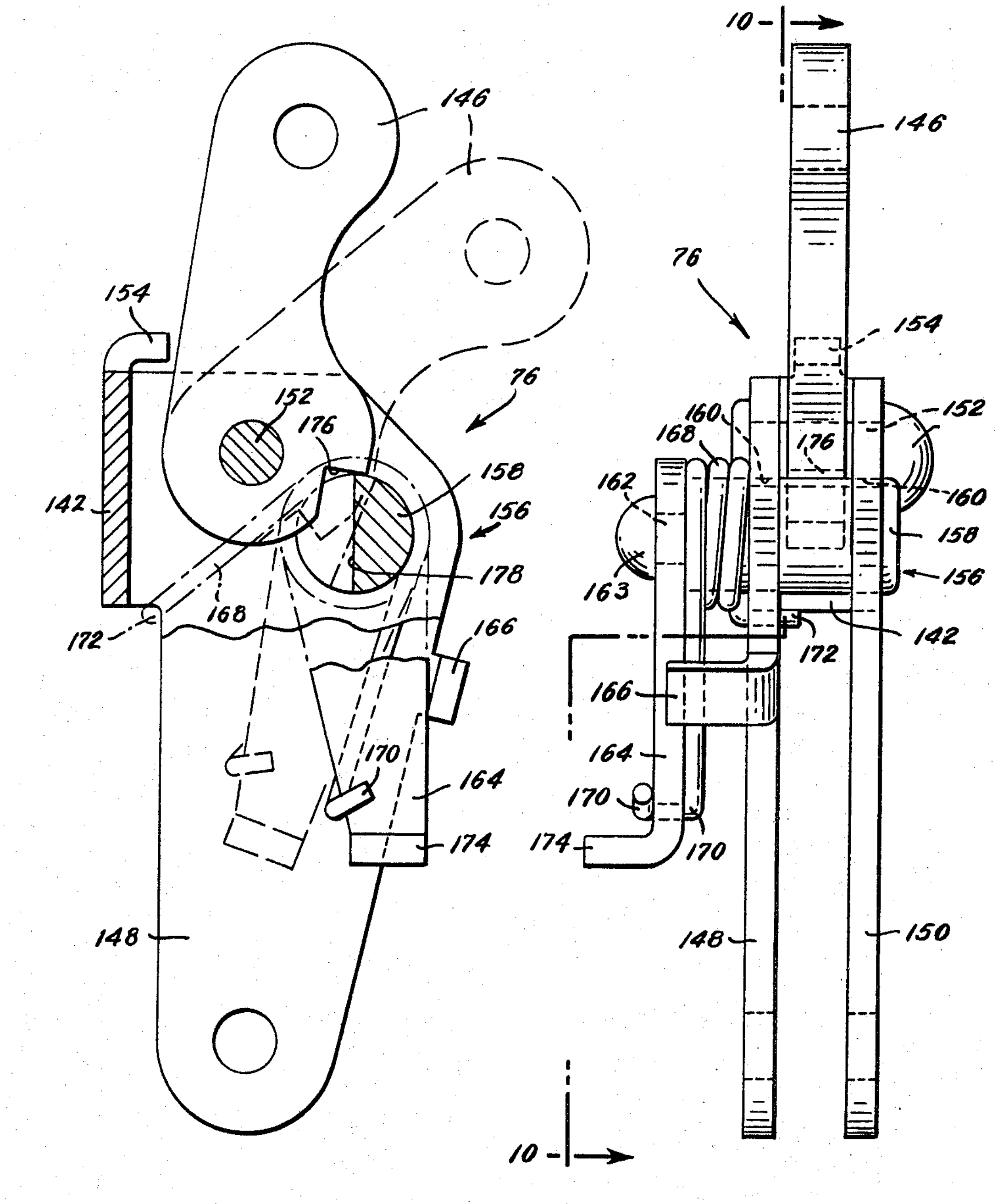
FIG. 9 is an end elevation of a toggle mechanism used in the FIG. 1 embodiment.
FIG. 10 is a side elevation of the FIG. 9 mechanism, partly in section and taken in the direction of sight lines 10—10 on FIG. 9.

As best seen in FIG. 10, the pivot point at pin 152 is maintained to the left of a line passing through the centers of pins 140 and 144 by a tab portion 154 bent out of center link 142 and bearing against link 146. In this manner, it can be seen that if forces are applied at the ends of the linkage assembly 76, that is, at pins 140 and 144, the linkage assembly will tend to collapse to the left as viewed in FIG. 10. This collapse is prevented by a rotary latch mechanism generally indicated by reference numeral 156 which provides a stop against rotational movement of links 142 and 146 in toggle-collapsing directions about pin 152.

Figures 11, 12, 13:
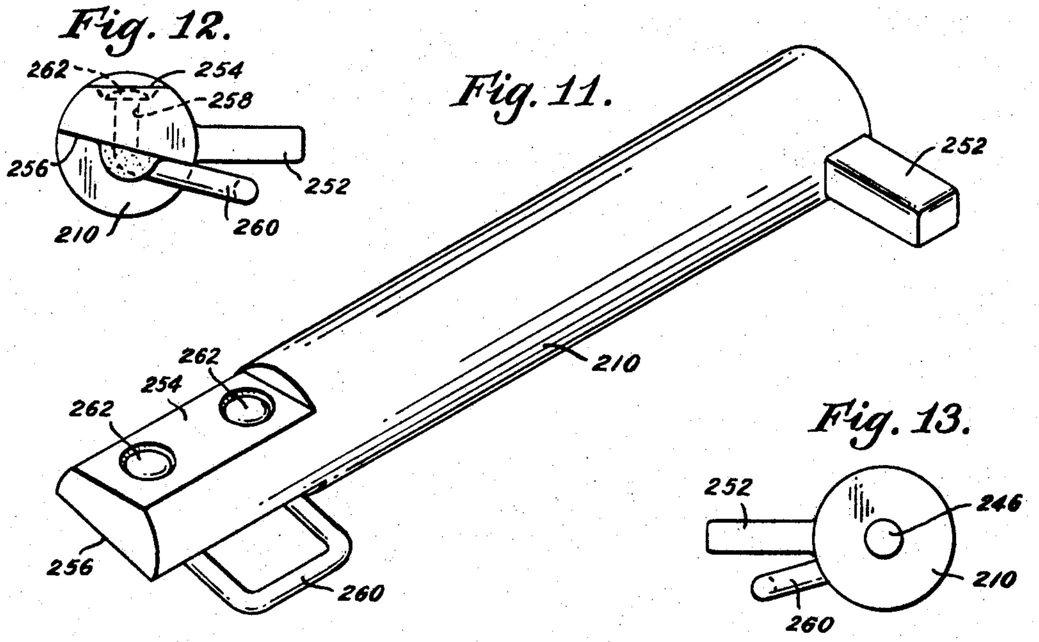
FIG. 11 is a perspective view of a phase linkage means constituting an element of the FIG. 1 embodiment.
FIG. 12 is an end view of the FIG. 11 linkage means.
FIG. 13 is a view of the other end of the FIG. 11 linkage means.

As best seen in FIGS. 10 and 11 rotary latch 156 includes a latch barrel 158 which extends through and is pivotally received in suitable apertures 160 located in the wings 148–150 of center link 142 and displaced from pivot point 152. Mounted on a necked-down end 162 of barrel 158 is a trip lever 164 which is retained on end 162 by a riveted over portion 163. The trip lever is restrained from rotation relative to barrel 158 by the noncircular shape or configuration, in cross section, of end 162 which when inserted in a similarly shaped aperture in trip lever 164, retains the latter against rotation in relation to the latch barrel 158. Alternatively, a tight frictional engagement between lever 164 and neck 162 may be used to prevent relative rotation of lever 164 and barrel 158.

The center link 142 includes a projecting tab portion 166 which provides a stop for lever 164. Lever 164 is urged against stop 166 by means of a torsion spring 168 (see FIGS. 10 and 11), one of whose ends, 170, bears against the lower portion of the trip lever 164 and the other of whose ends 172 bears against the center link 142. Lever 164 also includes, at its lower end (see FIGS. 10 and 11), a bent out tab portion 174 which is engageable by the cam 126 of lever 124 when armature 116 is actuated by magnetic assembly 70.

As best seen in FIG. 10, upper link 146 has a cut out portion or notch 176 which, in the latched solid-line position shown in FIG. 10, abuts the surface of latch barrel 158. This abutment retains the linkage assembly 76 in the substantially fixed position shown in FIG. 1 and in the solid-line position of FIG. 10, in which position linkage 76 acts substantially as a rigid body. The portion of barrel 158 intermediate the wings 148 and 150 of center link 142 is cut out to form a half moon section 178 as viewed in cross section in FIG. 10. When trip lever 164 is in the dotted-line position shown in FIG. 10, the periphery of latch barrel 158 no longer abuts surface 176 of link 146. Thus link 146 is free to rotate about pin 152 to the dotted-line position shown in FIG. 10. It will be noted that since a portion of link 146 is always present in the cut-out portion of barrel 158, a self-locking assembly of link 146, center link 142 and assembly 76 is achieved.

The contact arm assembly 74 comprises the movable contact arm 180 to which is welded, soldered or riveted the movable contact 182, a laterally extending ledge 184 being provided on arm 180 to facilitate this. A clevis 186 is provided at one end of arm 180, and the latter is pivotally mounted to frame 54 by pin 96 which passes through a slot 188 at the other end of arm 180 and is engaged in the frame apertures 98. A torsion spring 196 is mounted on pivot pin 96 for biasing contact arm 180 clockwise about pin 96, one end 198 of this spring engaging the under edge of arm 180 and the other end 200 bearing against the bottom of member 86.

Arm 180 is electrically connected to lead-in wire 190 of coil 104 by pigtail 192. The other lead-in wire 194 of coil 104 is electrically connected to terminal 22.

The operation of the device as so far described is as follows: Assume the circuit breaker unit 2 is connected into a phase of the circuit or component to be protected, at terminals 20 and 22. Previously the unit has been calibrated by bending tab 128 and tensioning spring 130 to fix the amount of electromagnetic force required to actuate armature arm 116 and hence to determine the amount of overload required to actuate the armature.

The toggle 42 is moved to the "on" or contacts-closed position as shown in FIG. 1. In normal operation in the closed position, the linkage assembly 76 acts as a rigid body since it is in the latched position shown in the solid-line portions of FIG. 10. In addition, the spring 196 exerts a force on the contact arm 180 tending to rotate it about pin 140 in a counterclockwise direction (as viewed in FIG. 1) to urge movable contact 182 into engagement with stationary contact 26.

When an overload condition (as determined by the setting of tab 128 and spring 130) occurs in the circuit through the magnetic assembly 70, armature 116 is actuated and moves trip lever 124 and surface 126 to engage trip lever 164, and thus unlatching rotary latch mechanism 156 and thereby allowing linkage mechanism 76 to collapse.

Figure 8:
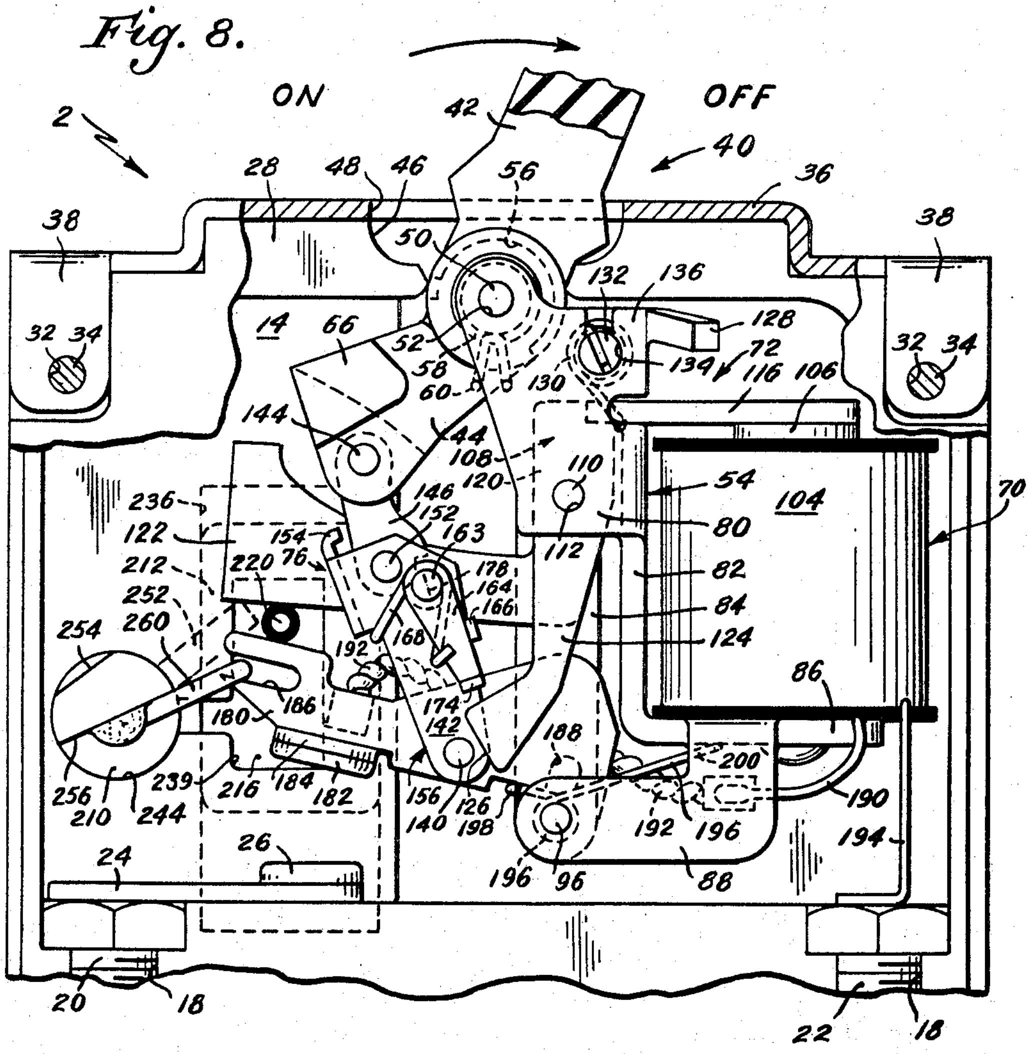
FIG. 8 is a view of the FIG. 1 embodiment but showing the parts in a position in which the contacts are fully open.

When linkage 76 collapses, thus releasing the fulcrum provided by pin 140, contact arm 180, acting under the force of spring 196 rotates about pin 96 to the contacts-open position shown in FIG. 8.

If manually-actuable toggle handle 42 is held in its contacts-closing position as shown in FIG. 1, the unit is trip-free, since the collapse of linkage mechanism 76 is not dependent on the position of handle 42.

If desired, suitable arc chambers (not shown) can be provided, in conventional manner, for the contacts 182–26 in each unit.

The linkage means for operatively associating the movement of a contact arm of one of the units of a multiphase circuit breaker with the tripping mechanism of others of the units will now be described, there being *n* linkage units associated with a combination of *n* unit circuit breakers, *n* being an integer and equalling two or more.

In this embodiment, one of the linkage means comprises a rotary unlatching device and the other linkage means comprises a slide or slides. The rotary linkage means extends from the first of the phase units to the last of a given number of units, and is operative only to link the motion of the contact arm of the first unit to the tripping mechanism of the last unit. The slide linkage means are positioned between the units, being adapted to connect the motion of the contact arm of another of the units to a tripping mechanism of an adjacent unit.

Referring to FIGS. 2 and 3, which illustrate a three-phase embodiment having units indicated generally by numerals 204, 206, and 208, the rotary linkage means 210 is in this instance a rod of electrical insulating material such as a molded phenolic resin, and the slide linkage means are sliding plates 212 and 214. In this embodiment, the units 204, 206, and 208 are the same as to their working parts, which have been described above in reference to FIG. 1. For this reason, the numerals which are used to refer to the parts of the FIG. 1 construction are also used for similar parts in each unit. Any difference in the housings of the units 204, 206 and 208 will be specifically set forth below.

Figures 14, 15, 16:
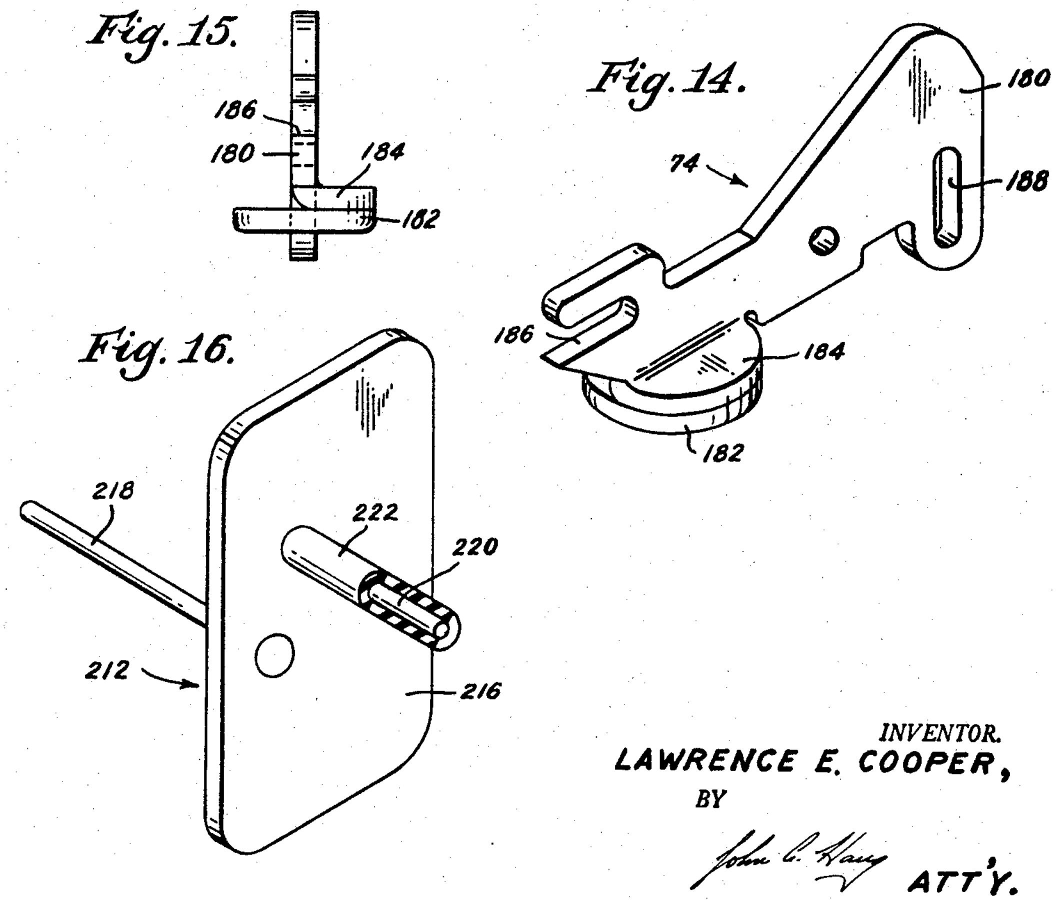
FIG. 14 is a perspective view of a contact arm used in the FIG. 1 embodiment.
FIG. 15 is an end view of the FIG. 14 contact arm.
FIG. 16 is a perspective view of another linkage means used in the FIG. 1 embodiment.

Referring now to FIG. 16 which illustrates in detail one of the slides, slide 212 comprises a flat plate 216 having laterally extending fingers 218 and 220, these fingers projecting from opposite sides of the plate 216, and comprising pins riveted to plate 216 or otherwise fastened. A sleeve 222 of electrical insulation is provided on finger 220. A second slide 214 is made the same as slide 212, and has the plate 224 and fingers 226 and 228.

Slide 212 is positioned between units 206 and 208 with finger 218 engaging to the clevis 186 at the end of the movable contact arm 180 of unit 206, and the other finger 220 being positioned under the end of the counter balance 122 of unit 208. As to slide 214, it is positioned between units 204 and 206, with finger 226 in the clevis 180 of the movable contact arm of unit 204 and finger 228 underlying the counter balance 122 of unit 206.

Figure 4:
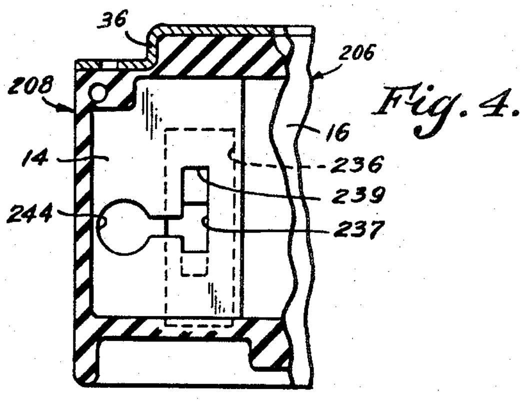
FIG. 4 is a portion of a wall of one of the units of FIG. 2, given to show the wall construction more clearly, and taken in the direction of sight lines 4—4 on FIG. 2.

Each of the respective slide linkage means is slidable in a space between adjacent units provided by forming (as by molding) a recess in each of the adjacent face walls of adjacent units of such depth and size that the plates of each slide can slide up and down freely therein. Illustrative of this are the recesses 234 and 236, recess 234 being in the face of unit 206, and recess 236 being in the adjacent wall of unit 208, these recesses being in register. Suitable slots 237 and 239 (see FIG. 4) are also provided in the respective walls of a unit to accommodate the motion of the fingers 218, 220, 226 and 228. In FIG. 4, the slot 237 is in the right hand wall of unit 206 (as drawn in FIG. 2) and slot 239 is in the left hand adjacent wall of unit 208. Slot 239 is displaced upwardly of slot 237 to accomodate the upward positioning of finger 220 above finger 218 in plate 216. Bearing holes 238, 240, 242 and 244 are connected to the respective finger slots by other slots as shown to facilitate assembly.

It will thus be seen that if slide 212 (for example) moves upwardly (as drawn) under the influence of the contact arm 180 of the unit 206, the pin 220 will move the balance arm 122 of unit 208 upward. This motion of balance arm 122 rotates the end of the trip lever 124 of unit 208 into engagement with the catch lever 164 of unit 208 and trips the toggle linkage of that unit to open the contacts 182–26. Similarly, if unit 204 trips, motion of the movable contact arm of unit 204 will be operatively linked by slide 214 to the balance arm 122 of unit 206, tripping the catch lever 164 of unit 206 and thus opening the contacts of the latter.

As has been indicated above, the rotary linkage means in this instance is a rod 210 of electrically insulating material. Referring to FIG. 3, it will be noted that the rod has, for its bearings, suitably provided holes 238, 240, 242, and 244 in the adjacent walls of the respective units. A suitable clearance is allowed between the ends of rod 210 and the two outer walls of units 204 and 208 to permit the rod to rotate freely without binding and yet at the same time to prevent too much end play thereof. If desired, at one end of rod 210 may be provided an axle or pivot 246 for engagement in a suitable bearing recess 248 provided in the wall 250.

At one end of rod 210 is provided the radially extending finger 252, and at the other end there is a portion provided with the flat section 254 and 256. Extending through the reduced end portion thus provided by flat portions 254 and 256 are the two holes 258. A U-shaped yoke or finger of wire 260 is provided having the upwardly bent ends 262, which ends are inserted in holes 258 and then peened over to secure the yoke 260 snugly against the flat portion 256.

Rod 210 is preferably made by molding it from an electrically insulating, tough, arc-resistant moldable resin, such as a phenolic resin. For wearing purposes, the yoke 260 is preferably made of steel wire. The finger 252 can be molded as an integral part of the rod 210, or it can likewise be made as is the yoke 260.

When rod 210 is positioned in the combined units 204, 206 and 208, finger 252 is positioned under the counter balance arm 122 of unit 204, and yoke or finger 260 is engaged in the slot or clevis 186 at the end of the movable contact arm 180 of unit 208. It is to be noted that the rotary linkage 210 does not mechanically engage either the balance arm 122 or the movable contact arm 180 of unit 206.

Figure 6:
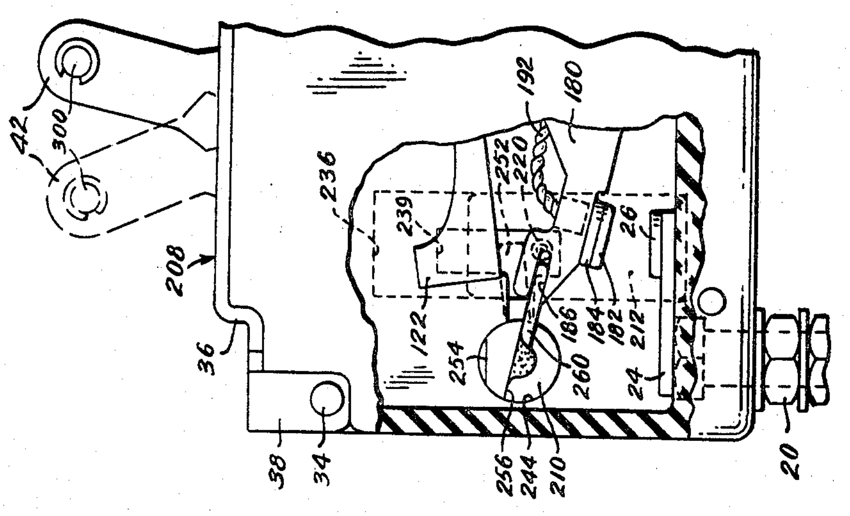
FIG. 6 is a view somewhat similar to the FIG. 1 view but showing a second position of the parts thereof.
Figure 7:
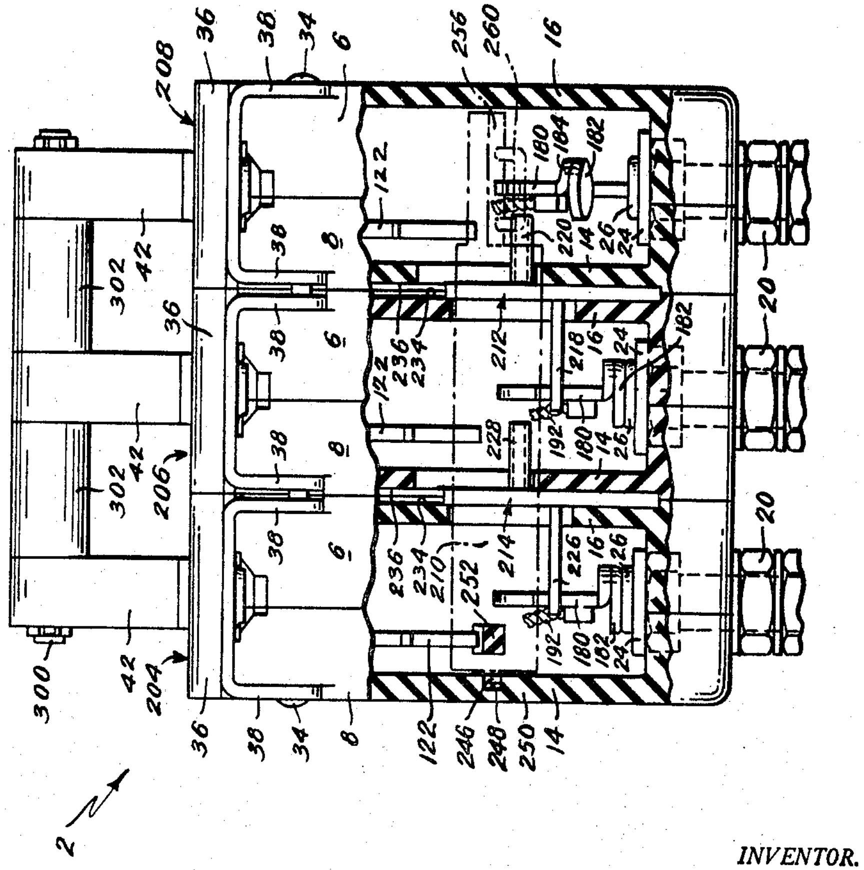
FIG. 7 is an end view of the embodiment of the FIG. 1 embodiment, but showing the parts in the FIG. 6 position.

With this construction, it will thus be seen that if unit 208 trips first and the movable contact arm 180 of unit 208 moves upwardly about its pivot 96, it will rotate the rod 210 via finger or yoke 260 and thus cause the finger 252 to engage and move upwardly the counter balance arm 122 of unit 204. This causes the unit 204 to trip its contacts. Thereafter, sequentially, contact arm 180 of unit 204 moves slide 214 upwardly which in turn trips the unit 206 by striking balance arm 122 of this unit. Were unit 208 not already tripped unit 206 would in turn trip unit 208 by moving slide 212 up until finger 220 moved balance arm 122 of unit 208 to tripping position. Reference to FIGS. 6 and 7 will illustrate the sequence given above for unit 208 tripping first. As drawn, the contact arm 180 of unit 208 is shown in an intermediate position on its way up to full open. In so moving, it has rotated the linkage means 210 to the point (as the motion is stopped for purposes of illustration) that the finger 252 has just contacted the balance arm 122 of unit 204. The contacts of both units 204 and 206 are still closed, but a slight additional motion of finger 252 will rotate arm 122 of unit 204 upward enough to trip the associated toggle mechanism. When this happens, contact arm 180 of unit 204 moves slide 214 between units 204 and 206 upwardly to trip unit 206, as aforesaid.

On the other hand, if unit 204 trips first, its movable contact arm will move slide 214 upwardly which in turn moves upwardly the counter balance 122 of unit 206. This in turn causes tripping of unit 208. If unit 206 should trip first, it will actuate slide 212 which in turn trips unit 208, and then the movable contact arm of unit 208 will trip unit 204 via the rod 210.

Thus, it is seen that with this mechanism, there are two independently movable linkage means associated with each unit, and these linkage means are so positioned and so related to the tripping mechanisms and the movable contact arms of each unit, that the operation of the units is always sequential, or in cascade. It is also to be noted that in each instance, the movable contact arm of each unit is responsible only for actuating the trip mechanism of another unit by moving the counter balance arm (and thus the trip lever) of the latter. This, then, lessens the aforementioned calibration and setting difficulties because not only is the loading requirement on each unit lessened because it need trip only one other unit, but because of there now being an oportunity to introduce lost motions between the respective working parts of the units, each unit can be individually calibrated to fairly wide mechanical tolerances.

Figure 19:
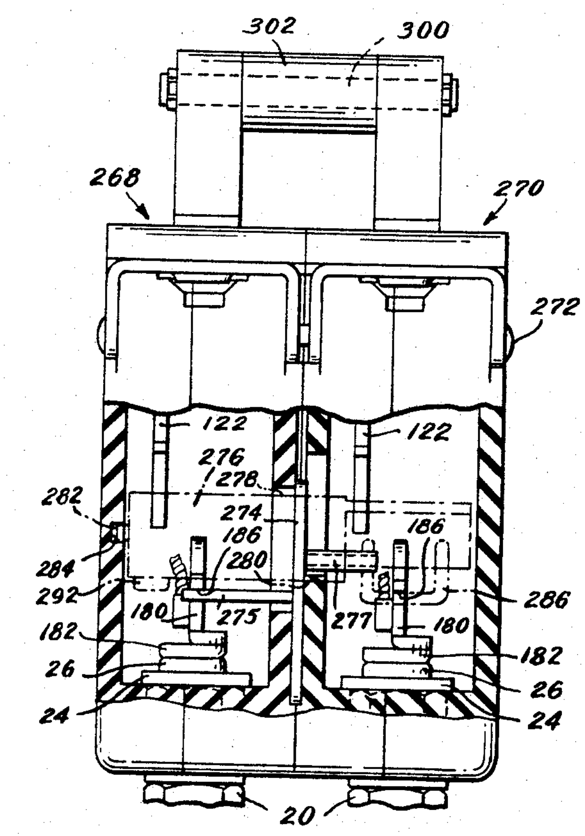
FIG. 19 is an end elevation, partly in section, of a 2-phase embodiment of the invention.
Figure 20:
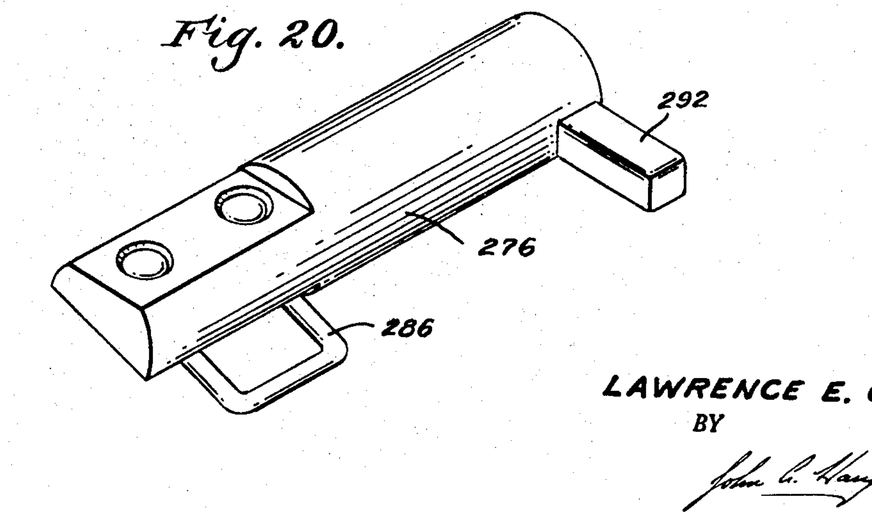
FIG. 20 is a perspective view of a linkage means used in the FIG. 19 embodiment.

Referring now to FIG. 19, there is shown a sectional view of a portion of a two-phase embodiment of this invention comprising the two circuit breaker units, indicated generally by numerals 268 and 270, each being made the same as units 204, 206 and 208. These units are placed in face to face manner, as has been described for the previous three-phase embodiment, and fastened securely together by conventional fastening means through the corners thereof, for example, by means of the rivets 272. The adjacent walls of the units are provided with the slide recesses and finger slots as in the prior embodiment. One slide 274 is provided, this slide being constructed the same as are constructed slides 212 and 214, and having the fingers 275 and 277.

The rotary linkage means 276 is made similar to rotary linkage rod 210, except that in this instance it is made shorter. Also, since there is only one pair of bearing holes 278 and 280 in the adjacent walls of the units, it has been found desirable to provide an axially extending pivot 282 at the end of rod 276 which engages a suitable recess 284 provided in the outside wall of unit 268. This provides another bearing for the rotary linkage means 276.

In this embodiment, the yoke 286 at the end of linkage means 276 engages the clevis 186 in the end of movable contact arm 180 of unit 270. At the other end of rotary linkage means 276 is provided an extending finger 292 which is positioned so as to actuate the counter balance arm 122 of unit 268 when the linkage means 276 is rotated by motion of the movable contact arm 180 of unit 270.

As in the first embodiment, it will be noted that if it is unit 270 which is tripped first by an overload current, the motion of its movable contact arm 180 will be transferred to the counter balance arm 122 of unit 268, via linkage 276, to open the contacts of unit 268. If unit 268 is tripped first, then motion of its movable contact arm 180 will actuate the slide 274 which in turn will move the counter balance arm 122 of unit 270 to trip the latter.

Again, it will be noticed that the movable contact arm of each unit is responsible solely for moving the trip mechanism of the other unit, and again calibration and setting of the various relationships in the unit is thus facilitated. Also, as in the previous embodiment, each unit has associated therewith two independently linkage means, one being the slide 274 and the other being the rotary linkage means 276. These linkage means are enabled to move independently of each other in the sense that there is no direct connection between them.

A further advantage is to be noted in that the operative mechanisms of all the units are made of the same parts. The housings of the units are the same, except that the two outside walls do not have the recesses and slots for the guides. By thus being able to use similar parts, great economy in tooling for the production of the devices may be achieved. Furthermore, economy is achieved in the assembly of multi-phase circuit breakers, in that essentially the same units are assembled in face to face relation with the slides therebetween, and then by using a rotary linkage of the kind herein described but of proper length, the assembly is made operative. Thus, any number of phases may be thus assembled as a package.

In all of the above embodiments, the manually actuable toggle means of the various units are linked together at their outside ends in conventional manner by means of a cross-rod 200 with the proper bushings or spacers 302 therebetween.

Reference has been made above to the counter balance arm 122 which appears in all of the units thus described. A counter balancing arm is not absolutely necessary for the correct operation of these units from the viewpoint of balancing the toggle linkage and armature. However, it is preferred if the units are to be made more resistant to shock. In the event that it is not desired to add a counter balance, a simple extension of the armature 116 can be provided in place of the counter balance 122, so positioned as to be operatively engaged by the respective and properly positioned fingers or extensions of the slide linkage means as is the counter balance arm 122.

In the embodiments thus described, a rotary linkage means has been set forth as the means for transferring motion from the contact arm of the first unit of a plural phase combination to the trip mechanism of the last unit thereof; and slide means have been set forth as the means for transferring motions between adjacent units. It has been found that the rotary linkage provides an inexpensive, easily made and simple transfer mechanism. If desired, however, slide means or lever means may be used between the first and last units.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having thus described my invention, what I claim as new and desire to secure by Letters Patent of the United States is:

1. The combination of a plurality of switch units, each unit including a base; a stationary contact in said base; a movable contact arm mounted on said base; a contact mounted on said arm and movable thereby, said contact being adapted to cooperate with said stationary contact to make and break an electrical circuit; latch means mounted on said base for trippably holding said movable contact in engagement with said stationary contact; tripping means on said base for tripping said latch means to cause opening of the contacts; manually actuable means on said base for resetting said latch means and for moving said movable contact into engagement with said stationary contact; at least two independently operable linkage means associated with each unit, each of said linkage means linking the motion of the movable contact of one of said units solely to the said tripping means of another of said units, the tripping means of said units being adapted by means of said linkage means to operate in cascade, and one of said linkage means being rotary comprising a cylindrical rod extending from one of said units to at least one other of said units; a first radially extending finger at one end of said rod; and a second radially extending finger at the other end of said rod; said first finger being adapted to be engaged by said movable contact arm for rotation of said rod during movement of said contact arm, and said second finger being adapted to operate the tripping means of another of said units upon said rotation.

2. The combination of a plurality of switch units, each unit including a casing; a stationary contact in said casing; a movable contact arm mounted in said casing; a contact mounted on said arm and movable thereby, said contact being adapted to cooperate with said stationary contact to make and break an electrical circuit; latch means in said casing for trippably holding said movable contact in engagement with said stationary contact; tripping means in said casing for tripping said latch to cause opening of the contacts; manually actuable means on said casing for resetting said latch means and for moving said movable contact into engagement with said stationary contact; at least two independently operable linkage means associated with each unit, each of said linkage means linking the motion of the movable contact of one of said units solely to the said tripping means of another of said units, the tripping means of said units being adapted by means of said linkage means to operate in cascade, and one of said linkage means being slidable comprising a flat plate slidable between adjacent units, a first finger laterally extending from one side of said plate and into one of said units; a second finger laterally extending from the other side of said plate and into the adjacent unit; said first finger being adapted to be engaged by said movable contact arm for movement of said slide, and said second finger being adapted to operate the tripping means of said adjacent unit upon said movement.

3. The combination of $n$ switching units, each unit including a base; a stationary contact on said base; a movable contact arm pivotally mounted on said base; a contact mounted on said arm and movable thereby, said contact being adapted to cooperate with said stationary contact to make and break an electrical circuit; manually actuable means pivotally mounted on said base, a knuckle joint on said base and having two links, one end of one of said links being pivotally attached to said contact arm, and one end of the other of said links being attached to said manually actuable means, the other ends of said links being pivotally attached together by a pin, said pin comprising in part a rotatable catch engageable by a detent formed at the end of one of said links; said detent and catch, when engaged, maintaining said knuckle joint in rigid condition with said movable contact engaged with said stationary contact; a lever at the end of said pin for rotating the latter; rotatable means mounted on said base and having an extension for operatively engaging said lever for rotating said pin; current responsive means for rotating said rotatable means; and at least $n$ independently operable linkage means associated with said combination, each of said linkage means linking the motion of the movable contact of one of said units solely with the said rotatable means of another of said units; said rotatable units being adapted by means of said linkage means to operate in cascade, and said rotatable means being adapted to release said detent from said catch to permit said knuckle joint to collapse and open said contacts independently of said manually actuable means being held in the contact-closed position.

4. The combination of a plurality of switch units, each unit including a base; a stationary contact on said base; a movable contact arm pivotally mounted on said base; a contact mounted on said arm and movable thereby, said contact being adapted to cooperate with said stationary contact to make and break an electrical circuit; manually actuable means pivotally mounted on said base, a knuckle joint in said casing having two links, one end of one of said links being pivotally attached to said contact arm, and one end of the other of said links being attached to said manually actuable means, the other ends of said links being pivotally attached together by a pin, said pin comprising in part a rotatable catch engageable by a detent formed at the end of one of said links; said detent and catch, when engaged, maintaining said knuckle joint in rigid condition with said movable contact engaged with said stationary contact; a lever at the end of said pin for rotating the latter; rotatable means mounted on said base and having an extension for engaging said lever for rotating said pin; current responsive means for rotating said rotatable means; and at least two independently operable linkage means associated with each of said units, each of said linkage means linking the motion of the movable contact of one of said units solely with the said rotatable means of another of said units; said rotatable units being adapted by means of said linkage means to operate in cascade, and said rotatable means being adapted to release said detent from said catch to permit said knuckle joint to collapse and open said contacts independently of said manually actuable means being held in the contact-closed position.

5. The combination according to claim 1 including electromagnetic means in said base for actuating said tripping means.

6. The combination according to claim 2 including electromagnetic means in said casing for actuating said tripping means.

7. The combination according to claim 1 in which said latch means is trip-free of said manually actuable means.

8. The combination according to claim 2 in which said latch means is trip-free of said manually actuable means.

9. The combination of a plurality of switch units, each unit including a casing; a stationary contact in said casing; a movable contact arm mounted in said casing; a contact mounted on said arm and movable thereby, said contact being adapted to cooperate with said stationary contact to make and break an electrical circuit; latch means in said casing for trippably holding said movable contact in engagement with said stationary contact; tripping means in said casing for tripping said latch to cause opening of the contacts; manually actuable means on said casing for resetting said latch means and for moving said movable contact into engagement with said stationary contact; and at least two independently operable linkage means associated with each unit, each of said linkage means linking the motion of the movable contact of one of said units solely to the said tripping means of another of said units, the tripping means of said units being adapted by means of said linkage means to operate in cascade, and one of said linkage means being rotary comprising a cylindrical rod extending from one of said units to at least one other of said units; a first radially extending finger at one end of said rod; and a second radially extending finger at the other end of said rod; said first finger being adapted to be engaged by said movable contact arm for rotation of said rod during movement of said contact arm, and said second finger being adapted to operate the tripping means of another of said units upon said rotation; and the other of said linkage means being slidable comprising a flat plate slidable between adjacent units; a first finger laterally extending from one side of said plate and into one of said units; a second finger laterally extending from the other side of said plate and into the adjacent unit; said first finger being adapted to be engaged by said movable contact arm for motion of said slide, and said second finger being adapted to operate the tripping means of said adjacent unit upon said motion.

References Cited

UNITED STATES PATENTS

| | | | |
|---|---|---|---|
| 3,116,387 | 12/1963 | Middendorf | 200—116 |
| 3,171,931 | 3/1965 | Powell | 200—116 |
| 3,193,646 | 7/1965 | Krebs et al. | 200—116 |
| 3,204,063 | 8/1965 | Nash et al. | 200—116 |

BERNARD A. GILHEANY, *Primary Examiner.*

H. BROOME, *Assistant Examiner.*